United States Patent
Leland

(10) Patent No.: US 9,011,690 B2
(45) Date of Patent: Apr. 21, 2015

(54) ORBITAL WASTEWATER TREATMENT SYSTEM AND ASSOCIATED METHOD OF OPERATING AN ORBITAL WASTEWATER TREATMENT SYSTEM

(71) Applicant: Ovivo Luxembourg S.a.r.l., Munsbach (LU)

(72) Inventor: Thomas W. Leland, Salt Lake City, UT (US)

(73) Assignee: Ovivo Luxembourg S.a.r.l., Munsbach (LU)

(*) Notice: Subject to any disclaimer, the term of this patent is extended or adjusted under 35 U.S.C. 154(b) by 131 days.

(21) Appl. No.: 13/835,942

(22) Filed: Mar. 15, 2013

(65) Prior Publication Data

US 2013/0256225 A1 Oct. 3, 2013

Related U.S. Application Data

(60) Provisional application No. 61/615,945, filed on Mar. 27, 2012.

(51) Int. Cl.
*C02F 3/00* (2006.01)
*C02F 3/12* (2006.01)
*C02F 3/16* (2006.01)

(52) U.S. Cl.
CPC ............ *C02F 3/1284* (2013.01); *C02F 3/006* (2013.01); *C02F 3/1257* (2013.01); *C02F 3/16* (2013.01); *C02F 2209/005* (2013.01); *C02F 2209/40* (2013.01); *Y10S 210/926* (2013.01)

(58) Field of Classification Search
USPC .............................. 210/926, 631, 97
See application file for complete search history.

(56) References Cited

U.S. PATENT DOCUMENTS

| | | | | |
|---|---|---|---|---|
| 4,291,004 A | * | 9/1981 | McCaffrey et al. | 423/242.7 |
| 4,857,208 A | * | 8/1989 | Jennelle | 210/745 |
| 4,917,805 A | * | 4/1990 | Reid | 210/605 |
| 5,269,940 A | * | 12/1993 | Kawamura et al. | 210/709 |
| 5,421,967 A | * | 6/1995 | Tubergen | 210/709 |
| 5,582,734 A | * | 12/1996 | Coleman et al. | 210/614 |
| 5,653,883 A | * | 8/1997 | Newman et al. | 210/617 |
| 8,057,674 B1 | * | 11/2011 | Leland et al. | 210/607 |
| 2007/0256980 A1 | * | 11/2007 | Krogue et al. | 210/688 |
| 2010/0032370 A1 | * | 2/2010 | Allen et al. | 210/603 |
| 2013/0299425 A1 | * | 11/2013 | McLeod | 210/639 |

* cited by examiner

*Primary Examiner* — Chester Barry
(74) *Attorney, Agent, or Firm* — R. Neil Sudol; Michael Polacek; Henry D. Coleman

(57) ABSTRACT

An orbital wastewater treatment system generally including a tank assembly and at least one impeller in the tank assembly for moving mixed liquor under process about the tank assembly is provided with an wastewater inflow sensor, an impeller power meter, and a control unit for periodically and incrementally varying impeller speed and weir height in order to reduce energy consumption. Operating such a wastewater treatment system comprises flowing mixed liquor or wastewater into a treatment pool in the tank assembly, rotating the impeller within the pool to move the mixed liquor or wastewater, and adjusting, in concert, a rate of rotation of the impeller and a level or depth of the pool to reduce a rate of energy usage per unit inflow volume while maintaining at least one process parameter such as dissolved oxygen content substantially constant at a given level in the pool.

37 Claims, 1 Drawing Sheet

ORBITAL WASTEWATER TREATMENT SYSTEM AND ASSOCIATED METHOD OF OPERATING AN ORBITAL WASTEWATER TREATMENT SYSTEM

BACKGROUND OF THE INVENTION

This invention relates to an orbital wastewater treatment system. This invention also relates to an associated method of operating an orbital wastewater treatment system.

In a wastewater process employing an activated sludge process, wastewater impurities including domestic wastes, sugars, lipids, proteins, carbohydrates and other nitrogen- and phosphorous-containing materials are decomposable by microorganisms, as is well known in the art. As the impurities are decomposed, a sludge of settled material and microorganisms is wasted from the process either on a continuous or non-continuous basis. The purpose of sludge wasting is to keep solids from building up in the system. Sludge from the process is normally transported by pumping to a digester for treatment prior to landfill or other disposal so as to reduce the volatile organic content of the sludge, reduce the sludge volume, reduce the pathogenic organisms present in the sludge, reduce its odor potential and improve sludge dewaterability, and for other reasons of lesser importance. Various prior art types of digesters and various digestion and stabilization processes have been proposed and used.

An early circa 1960 installation by Pasveer for wastewater, i.e. primarily sewage, purification by the activated biological sludge method included a closed circuit or ditch with a horizontally-rotated brush rotor used for adding needed oxygen (air) to the sewage and moving the sewage in circulation. In U.S. Pat. No. 3,510,110, an orbital system employing an elongated tank with central partition was disclosed which employed a vertically-rotated surface aerator located at the end(s) of the partition wall for both aerating the sewage and circulating the sewage around the channels formed by the partition wall and the sides of the tank. This latter system has had great commercial success with over 1000 plants in operation world-wide (ranging from less than 1 MGD capacity to one of over 10 million population equivalent) with over 600 plants in operation or in various construction phases since 1976 in the United States up to the present time. Sold under the trademark "Carrousel®", the high popularity of the system is due primarily to its cost-effectiveness, simplicity of design, ease of operation and maintenance, and excellent effluent quality. It can treat raw domestic water to EPA advanced secondary standards without primary clarifiers or effluent filters. With extended aeration, it produces a highly stable water sludge requiring little or no further processing prior to disposal. Carrousel® orbital wastewater treatment systems can be designed to have a power turn-down of 50 to 85 or 90%. Aerator drive horsepower can be varied from 100% of installed capacity to as little as 10% without loss of mixing and continuing sufficient mixed liquor channel velocity. (See U.S. Pat. No. 4,869,818.) This power turn-down flexibility provides an ability to closely match oxygen input to the mixed liquor to oxygen demand of the microbes acting to degrade the sewage, without loss of mixing and movement. In one of the largest U.S. installations, over 25 MGD of sewage is treated in four units having twelve aerators utilized to aerate and circulate sewage through sixteen channels formed by twelve partitions and exterior encircling concrete walls forming four basins.

Improvements in Carrousel® orbital wastewater treatment systems are disclosed in U.S. Pat. No. 4,869,818, U.S. Pat. No. 4,940,545 and U.S. Pat. No. 7,186,332. In general, each Carrousel® orbital wastewater treatment system sold under the trademark denitIR® includes a tank having at least one partition that defines an anoxic zone and an aerobic zone that are operated in accordance with the modified Ludzack-Ettinger (MLE) Process. The partition also defines passages from said aerobic zone to said anoxic zone and from said anoxic zone to said aerobic zone. At least one impeller/aerator is located in said tank for moving mixed liquor under process about said tank and for increasing the dissolved oxygen content of the liquor in the aerobic zone. An flow-diversion gate is provided at the passage for controlling the recycling of nitrates to the anoxic zone from the aerobic zone. (See U.S. Pat. Nos. 8,318,016 and 8,857,674.) The aerator is efficient in oxygen transfer and mixing so as to maintain solids in suspension while varying oxygen input so that the main channel flow reaches an anoxic condition as it passes the flow-diversion gate. In the anoxic basin or zone, screened and degritted influent and recycled activated sludge are mixed with nitrified mixed liquor, providing optimized conditions for high rate denitrification, pursuant to the MLE Process. Bacteria feed on the carbon-rich influent, using molecular oxygen from the abundant nitrate to drive metabolic reactions. Nitrate is first reduced to nitrite, then to nitrogen gas, which is subsequently stripped in the aeration basin. In the process, portions of the alkalinity and oxygen consumed during nitrification are restored.

A low-speed surface aerator in orbital wastewater treatment tanks typically takes the form of a specially designed impeller spinning over a range of about 15 to 50 rpm. The impeller has a fixed number of blades, which pump water from below and throw off a large spray pattern of small droplets. This process provides dissolved oxygen to the water. The combination of aerator speed (as controlled, for instance, by a variable frequency drive) and aerator submergence (as controlled by an adjustable weir that adjusts water level relative to the aerator blades) determines the horsepower draw of the unit. The higher the horsepower, the higher the mass of dissolved oxygen in the water. Low-speed surface aerator transfer efficiencies are generally expressed as pounds of dissolved oxygen delivered to the wastewater per unit horsepower per hour (lb O2/HP-hr) reported under standardized conditions of atmospheric pressure, temperature and other variables.

There are essentially an infinite number of combinations of aerator submergence and speed that draw the same horsepower (higher sped and lower submergence vs. lower speed and higher submergence). While aerator transfer efficiencies (lb/HP-hr) are generally reported as a constant value, the actual efficiency varies with aerator diameter, basin geometry, aerator submergence, and aerator speed. Through decades of testing, no one has been known to find a method to accurately and consistently predict aerator transfer efficiencies as a function of these and other variables. The industry typically designs systems and reports transfer efficiencies based on average or minimum values derived from actual testing.

If, once an aerator impeller diameter and basin geometry have been selected, the aerator could be operated at the conditions of submergence and speed that produce an enhanced, if not maximized, transfer efficiency, significant energy savings would result. These savings could be on the order of 10-20%. Given that aeration is a large consumer of power (typically 40-60% of a wastewater treatment plant's energy bill), this would be a feature of interest to municipalities.

Orbital wastewater treatment plants optionally include a forced-air diffuser. Thus, in some plants, aeration of the wastewater may be accomplished by both mechanical means—impeller aeration—and by diffused aeration.

OBJECTS OF THE INVENTION

An object of the present invention is to provide an improved orbital wastewater treatment system and/or an improved method for operating an orbital wastewater treatment system.

Another object of the present invention is to provide such an improved orbital wastewater treatment system that is more efficient to operate.

A more particular object of the present invention is to provide such an improved orbital wastewater treatment system that is operable with reduced energy usage.

Yet another object of the present invention is to provide such an improved orbital wastewater treatment system and/or method which exhibits combined aeration processes, namely mechanical aeration by an impeller combined with diffused air injection by a blown-air diffuser.

These and other objects of the invention will be apparent from the drawings and descriptions herein. Although each of the objects of the invention is believed to be attained in at least one embodiment of the invention, there is not necessarily any one embodiment that achieves all of the objects of the invention.

SUMMARY OF THE INVENTION

The present invention is directed in part to a method for operating an orbital wastewater treatment system so as to at least reduce, if not minimize, energy consumption. An orbital wastewater treatment system generally includes a tank assembly and at least one impeller in the tank assembly for moving mixed liquor under process about the tank assembly. A method for operating such a wastewater treatment system comprises flowing mixed liquor or wastewater into a treatment pool in the tank assembly, rotating the impeller within the pool to move the mixed liquor or wastewater under process about the tank assembly, and adjusting, in concert, a rate of rotation of the impeller and a degree of submergence of the impeller in the pool to reduce a rate of energy usage per unit inflow volume, that is, a rate of energy usage as a function of volumetric inflow rate or load. More particularly, the rate of impeller rotation and the degree of impeller immersion are adjusted in concert to reduce a rate of energy usage while maintaining at least one process parameter—preferably dissolved oxygen content—substantially constant at a given level in the pool.

Adjusting the degree of impeller submergence or immersion is typically implemented by adjusting the depth or level of the pool, for instance, by adjusting the height of a movable weir.

The method contemplates periodically incrementally adjusting the rate of rotation of the impeller and periodically incrementally adjusting the degree of submergence of the impeller in the pool. The incremental adjustments are made in accordance with periodic determinations of energy usage rate. The energy usage rate is typically determined by dividing the energy used in rotating the impeller over a given time period, by the volume of wastewater fed to the mixed-liquor pool during the same period. The volume of inflowing wastewater may be measured or, alternatively, may be read from a pre-established table or schedule of time-weighted average flow rates. If measured, then an average flow rate may be calculated from several successive measurements. In addition, after an average is determined, further measurements may be delayed for a predetermined period of time on the assumption that flow rates will not change significantly over that period.

Adjustment of the degree of impeller submergence or immersion on the wastewater pool may be accomplished by alternately raising and lowering the impeller relative to the tank assembly and/or by raising or lowering the level or depth of the pool, for instance, by modifying the effective height of a weir.

The energy usage minimization process typically includes periodically incrementally changing a magnitude of impeller rotation speed in a first direction (for instance, in a positive direction, resulting in a rotation speed increase) and concomitantly periodically incrementally changing a magnitude of pool depth in a second direction (for instance, in a negative direction, reducing the pool depth and concomitantly the degree of impeller immersion), provided that successive adjustments result in a reduced energy usage per unit inflow volume. The direction of impeller speed adjustment and the direction of pool depth adjustment are always opposed so as to maintain the one or more process parameters (e.g., dissolved oxygen content) substantially constant at a given level in the pool, thereby ensuring that process demand is met.

Where any given adjustment of the rate of rotation of the impeller and the degree of submergence of the impeller in the pool results in an increased energy usage per unit inflow volume, the subsequent adjustment of impeller rotation speed and degree of impeller immersion entails changing a magnitude of impeller rotation speed in a direction opposite to the previous direction of rotation speed adjustment and concomitantly changing a magnitude of pool depth in a direction opposite the previous change in pool depth. Thus, there may be a series of adjustments stepwise decreasing impeller rotation speed and simultaneously stepwise increasing pool depth and concomitantly the degree of impeller immersion. Energy usage per unit volume of inflowing sewage is measured after each adjustment. Once an increase in the energy usage rate is detected, the next adjustment slightly increases impeller rotation speed and decreases pool depth and impeller immersion.

The method of the present invention more specifically includes (a) ascertaining (measuring or looking up) a rate of inflow of the mixed liquor or wastewater into the tank assembly, (b) measuring or monitoring energy usage by the impeller, (c) periodically calculating the rate of energy usage per unit inflow volume from the ascertained rate of inflow and the energy usage by the impeller, (d) comparing successive calculations of the rate of energy usage per unit inflow volume with one another, and (e) adjusting the rate of rotation of the impeller and the degree of submergence of the impeller in the pool in accordance with changes in energy usage rate as determined by the comparison of successive energy use calculations. Adjusting the rate of rotation of the impeller and the degree of submergence of the impeller in the pool preferably constitutes either (1) decreasing impeller rotation speed and increasing pool depth or (2) increasing impeller rotation speed and decreasing pool depth.

The orbital wastewater treatment system generally includes at least one weir in the tank assembly, so that the adjusting of the degree of submergence of the impeller in the pool may be implemented by moving the weir. It is to be noted that impeller speed and pool depth normally have boundary limitations. When an impending increase in impeller speed will exceed a maximum speed, the rotation speed increase is omitted. Impeller rotation may be decremented instead, with an associated increase in pool depth. Similarly, when in impending increase in pool depth will exceed a maximum depth, the adjustment may be omitted and instead pool depth may be incrementally reduced, with an associated increase in impeller speed.

A method for operating an orbital wastewater treatment system comprises, in accordance with the present invention, (i) flowing mixed liquor or wastewater into a treatment pool in a tank assembly, (ii) measuring a rate of inflow of the mixed liquor or wastewater into the tank assembly, (iii) rotating an impeller within the pool to move the mixed liquor or wastewater under process about the tank assembly, (iv) determining a first rate of energy usage per unit inflow volume from (a) the measured rate of inflow and (b) energy usage by the impeller, (v) adjusting a rate of rotation of the impeller and a degree of submergence of the impeller in the pool, (vi) thereafter adjusting the rate of rotation of the impeller and the degree of submergence of the impeller in the pool, (vii) determining a second rate of energy usage per unit inflow volume from the rate of inflow and the energy usage by the impeller, (viii) comparing the second rate of energy usage with the first rate of energy usage to determine a net change in energy consumption, and (ix) subsequently adjusting the rate of rotation of the impeller and the degree of submergence of the impeller in the pool in accordance with the net change in energy consumption. The adjustments to impeller rotation speed and to pool depth or impeller immersion degree are preferably made in concert so as to substantially maintain a process parameter such as dissolved oxygen content at a desired level. To achieve this result, the rate of rotation of the impeller and the degree of submergence of the impeller in the pool are adjusted in directions opposite to one another. The adjustments of the rate of rotation of the impeller and the degree of submergence of the impeller in the pool in accordance with the net change in energy consumption are in directions identical to those of a prior adjustment when the net change in energy consumption is negative. The adjustments of the rate of rotation of the impeller and the degree of submergence of the impeller in the pool in accordance with the net change in energy consumption are in directions identical opposite to those of a prior adjustment when the net change in energy consumption is positive.

The adjusting of the rate of rotation of the impeller and the degree of submergence of the impeller in the pool in accordance with the net change in energy consumption includes an adjustment protocol taken from the group consisting of (a) decreasing impeller rotation speed and increasing pool depth and (b) increasing impeller rotation speed and decreasing pool depth.

The present invention is also directed in part to an orbital wastewater treatment system that may automatically find a combination of impeller immersion depth and rotation speed that exhibits a minimal energy usage while maintaining sufficient aeration to meet process demands. As discussed hereinafter, aeration may be maintained in part by adjusting operating parameters of a diffuser assembly to compensate for changes in aeration by the impeller.

The present invention contemplates a control system that reads kilowatt usage measured by a variable frequency drive or power meter connected to the aeration equipment and makes automatic adjustments to aerator/impeller submergence (by raising or lowering an electronically actuator effluent weir) and speed (by adjusting the frequency of the variable frequency drive) to find the most efficient operating condition of the aerator/impeller. It should be noted that adjusting aerator/impeller speed and submergence for purposes of controlling dissolved oxygen content, oxidation-reduction potential and other water parameters as measured by probes installed in the tank or basin is known and extensively practiced in the industry. The present invention specifically contemplates finding the most energy efficient operating point of aerator/impeller submergence and speed while still controlling these common wastewater parameters.

An orbital wastewater treatment system comprises, in accordance with the present invention, a tank assembly, at least one impeller in the tank assembly for moving mixed liquor under process about the tank assembly, a movable weir operatively mounted to the tank assembly, a mixed-liquor infeed conduit extending to the tank assembly, a flow meter in operative relationship to the conduit, a variable speed motor operatively connected to the impeller, an actuator operatively connected to the weir, and a control unit operatively connected to the flow meter, the actuator and the motor. The control unit is configured to calculate a rate of energy usage per unit inflow volume of mixed liquor or wastewater from impeller activity and a rate of mixed-liquor or wastewater infeed as measured or sensed by the flow meter. The control unit is further configured to operate the actuator and the motor to adjust a rate of rotation of the impeller and a degree of impeller immersion in a wastewater pool in the tank assembly to reduce a rate of energy usage per unit inflow volume, or rate of energy usage as a function of inflow.

Pursuant to another feature of the present invention, the control unit is configured to operate the actuator and the motor to periodically and incrementally adjust the rate of rotation of the impeller and the degree of submergence of the impeller in the pool in opposing directions to maintain at least one process parameter substantially constant at a given level in the pool. Preferably, the at least one process parameter is dissolved oxygen content.

The control unit may be configured to automatically operate the actuator and the motor to periodically incrementally change a magnitude of impeller rotation speed in a first direction and concomitantly periodically incrementally change a magnitude of pool depth in a second direction, provided that successive adjustments result in a reduced energy usage per unit inflow volume, wherein the first direction and the second direction are opposed so as to maintain the at least one process parameter including dissolved oxygen content substantially constant at the given level in the pool. It is contemplated that the control unit is additionally configured to automatically operate the actuator and the motor to change a magnitude of impeller rotation speed in a direction opposite to the first direction and concomitantly change a magnitude of pool depth in a direction opposite the second direction, where a prior adjustment of the rate of rotation of the impeller and the degree of submergence of the impeller in the pool resulted in an increased energy usage per unit inflow volume.

In at least one embodiment of the present invention, the control unit is configured to automatically operate the actuator and the motor in response to calculated rates of energy usage per unit inflow volume as determined by the control unit. In such an embodiment, the control unit automatically compares successive calculations of the rate of energy usage per unit inflow volume with one another and automatically adjusts the rate of rotation of the impeller and the degree of submergence of the impeller in the pool in accordance with changes in energy usage per unit inflow volume as determined by the comparing of successive calculations. Alternatively, human operator supervision may instruct the control unit as to the adjustments in impeller rotation speed and pool depth.

As disclosed in U.S. Pat. No. 4,869,818, an impeller shaft is typically provided with a separate aerator. The aerator is disposed at an upper end of the impeller drive shaft and accordingly will have a degree of immersion in the pool that varies in accordance with the depth of the pool and the degree of impeller submergence. The term "impeller" as used herein broadly denotes an impeller without an aerator and more narrowly denotes an impeller including an aerator.

Changes in aerator immersion and change in impeller (and aerator) rotation speed can result in changes in dissolved oxygen content. Where an orbital wastewater treatment system includes at least one diffuser assembly powered by a blower, a method pursuant to the present invention may additionally comprise adjusting operating parameters of the diffuser assembly in accordance with adjustments in the rate of rotation of the impeller and the degree of submergence of the impeller in the pool. The adjustment of the operating parameters of the diffuser assembly may include changing a diffusion or aeration rate thereof so as to balance or compensate for changes in a rate of aeration of the pool by the impeller. The adjustment of the operating parameters of the diffuser assembly may include changing a rate of power usage by the blower in accordance with changes in a rate of aeration of the pool by the aerator/impeller.

DETAILED DESCRIPTION

Figure 1:
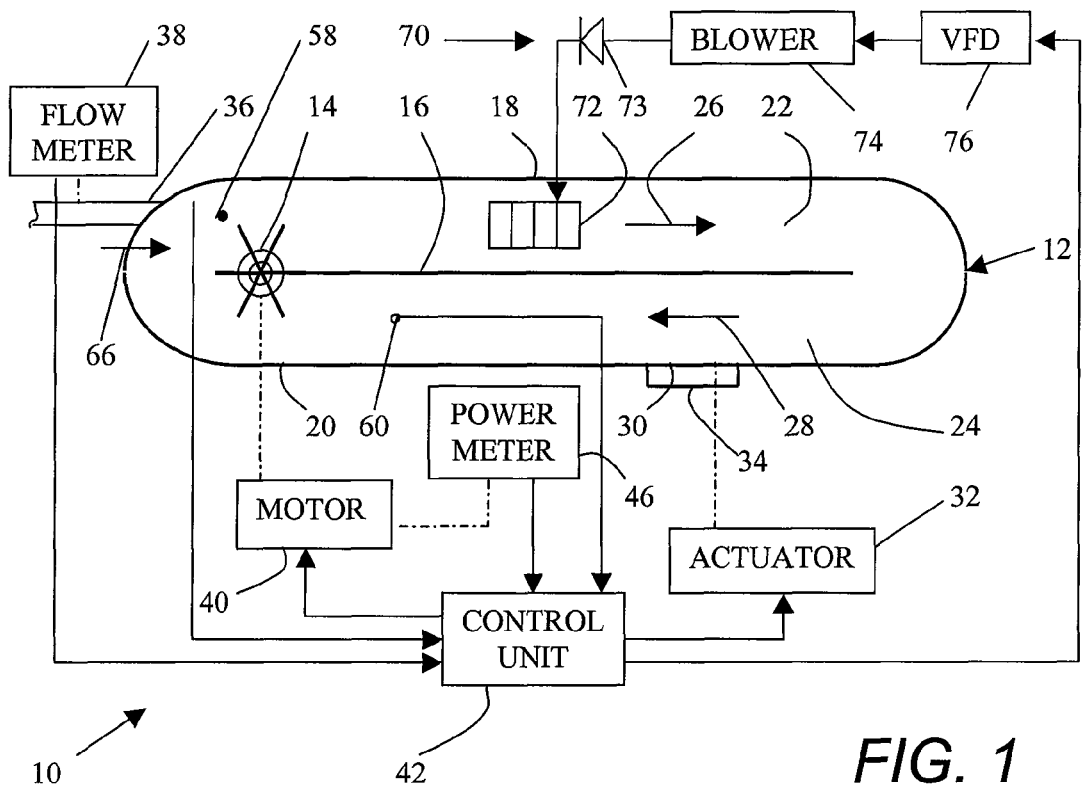
FIG. 1 is partially a block diagram and partially a schematic plan view of an orbital wastewater treatment system with energy-conserving features in accordance with the present invention.

FIG. 1 shows an orbital wastewater treatment system 10 generally including a tank assembly 12 and at least one impeller 14 disposed in the tank assembly for aerating mixed liquor and moving mixed liquor under process along an endless path around a partition wall 16. Partition wall 16, together with a first linear outer wall 18 and a second linear outer wall 20 of tank assembly 12, defines a pair of elongate flow channels 22 and 24 along which mixed liquor flows in respectively opposing directions, as indicated by arrows 26 and 28.

A movable weir 30 is operatively mounted to tank assembly 12 for adjusting the height or level of a pool of wastewater or mixed liquor in the tank assembly. At least one actuator 32 in the form of a hydraulic or pneumatic cylinder, a solenoid, an electric motor or other motive device is operatively connected to weir 30 for varying the position or configuration of the weir to effectuate pool level adjustment. Depending on the vertical position of the weir 30, clarified liquid flows from the tank assembly over the weir into an overflow launder 34.

A mixed-liquor infeed conduit 36 extends to tank assembly 12. A flow meter 38 disposed in operative relationship to infeed conduit 36 senses the rate of flow 66 into tank assembly 12 and generates an analog signal indicative of the flow rate.

A variable speed motor 40 is connected to impeller 14 for rotating the impeller at different angular velocities about a vertical axis.

Figure 2:
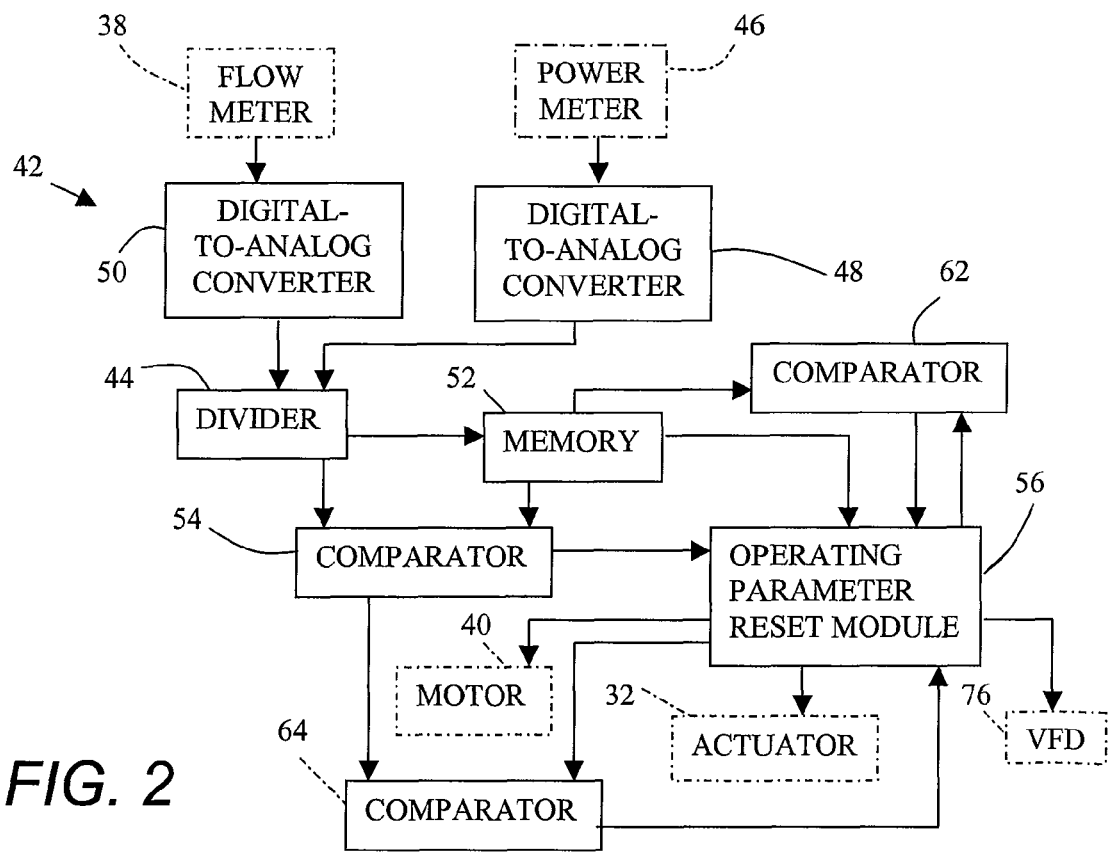
FIG. 2 is a block diagram of a control unit shown in FIG. 1.

A control unit 42 is operatively connected to flow meter 38, actuator 32 and motor 40. Control unit 42 is configured to calculate a rate of energy usage per unit inflow volume of mixed liquor or wastewater from impeller activity and a rate of mixed-liquor or wastewater infeed as measured or sensed by flow meter 38. More particularly, as depicted in FIG. 2, control unit 42 includes an arithmetic divider 44 that receives energy usage data from a power meter 46 via an analog-to-digital converter 48 and volume inflow rate data from flow meter 38 via another analog-to-digital converter 50. Divider 44 may be implemented in the form of a hard-wired logic circuit or may be implemented as generic circuits of a microprocessor programmed to calculate the quotient of energy per unit volume. Divider 44 may be connected to a memory 52 for storing successive values of computed energy usage quotients.

Control unit 42 may additionally comprise a comparator 54 that is linked to divider 44 and memory 52 for comparing successive energy usage quotients to determine whether energy usage is becoming more efficient (current quotient minus prior quotient is negative) or less efficient (current quotient minus prior quotient is positive) in response to changing operating parameters, specifically impeller rotation speed and pool depth (impeller immersion). To vary those operating parameters, to the end of reducing the rate of energy usage per unit inflow volume, control unit 42 is configured with an operating parameter reset module 56 to operate actuator 32 and motor 40 to respectively adjust the rate of rotation of impeller 14 and the vertical positioning of weir 30. Module 56 receives a success measure from comparator 54 and accesses memory 52 to determine the direction (increase or decrease) and amounts to increment impeller rotation speed and pool depth.

Thus, control unit 42 and particularly module 56 is hard-wired or programmed to operate actuator 32 and motor 40 to periodically and incrementally adjust the rate of rotation of impeller 14 and the level or depth of the treatment pool in tank assembly 12 in opposing directions (increase one, decrease the other) to maintain at least one process parameter substantially constant at a given level in the pool. Preferably, that one process parameter is dissolved oxygen content. Control unit 42 operates to maintain the one or more selected process parameters, particularly including dissolved oxygen content, at respective preselected levels. Multiple sensors 58 and 60, e.g., nitrate and/or dissolved oxygen sensors, may be disposed in tank assembly 12 for monitoring the process parameters.

Control unit 42 may be provided with input elements such as keypads and touch screens (not shown) for operator intervention and supervision. Thus an operator may input into memory 52 the magnitudes and directions of impeller speed changes and pool depth modifications to be implemented at any given stage of a tank operation. Control unit 42 may take the form of a modified Oculus™ Control System, a PLC-based system with color touch screen operator interface currently offered by Ovivo Luxembourg S.à.r.l. The Oculus™ Control System includes variable frequency drives or motors for impeller rotation, electronically operated weir position actuators for pool depth control, and in-basin probes or sensors for monitoring process parameters. The Oculus™ Control System is easily modified to carry out the functions of control unit 42 as described herein. In particular, the operating software is modified to show the relevant operating parameters—wastewater infeed flow rate, impeller power consumption, energy quotient data, impeller speed adjustments, and weir height adjustments—on an operator interface and to enable suitable operator control.

In certain cases, the energy consumption reduction method described herein will have to be sidelined. For instance, in an Auto 1 mode of operation of the modified Oculus™ Control System, an operator may set a liquid level to maintain and use a PID controller to raise and lower the weir 30. This is recommended for a fully loaded tank assembly 12 as the plant will need to maintain maximum immersion at all times, at different weir crests. Otherwise, in an Auto 2 mode, the energy optimization protocol described herein can be used.

Control unit 42 may be configured to automatically operate actuator 32 and motor 40 to periodically incrementally change a magnitude of rotation speed of impeller 14 in a first direction and concomitantly periodically incrementally change a position of weir 30 and thus pool depth in a second direction, provided that successive adjustments continue to result in a reduced energy usage per unit inflow volume, wherein the first direction and the second direction are opposed (one increased, the other decreased) so as to maintain the one or more process parameters, including dissolved oxygen content, substantially constant at the given level(s) in the mixed-liquor pool. When control unit 42 and particularly comparator 54 and parameter reset module 56 detect that a prior adjustment of the rate of rotation of impeller 14 and of the position of weir 30 (level or depth of the pool) resulted in an increased energy usage per unit inflow volume, parameter reset module 56 automatically operates actuator 32 and variable speed motor 40 to change a magnitude of impeller rotation speed in a direction opposite to the first direction and concomitantly change a magnitude of pool depth in a direction opposite the second direction.

In this substantially completely automated embodiment, control unit 42 automatically operates actuator 32 and motor 40 in response to rates of energy usage per unit inflow volume as calculated by divider 44. Comparator 54 automatically compares successive calculations of the rate of energy usage per unit inflow volume with one another and parameter rest module 56 automatically adjusts the rate of rotation of impeller 14 and the position of weir 30—and thus the level or depth of the pool in tank assembly 12—in accordance with changes in energy usage per unit inflow volume as determined by the operation of comparator 54. Alternatively, human operator supervision may instruct control unit 42 via a touch screen interface, keyboard, or other known input device (none shown) as to the adjustments in impeller rotation speed and pool depth.

An energy efficiency system as described herein is superimposed on current process controls. Thus, the system controls (for instance, wastewater inflow rate, weir position, impeller speed) are first adjusted to set operating parameters at desired levels for the current process. Once a steady state is achieved, the present method is carried out to reduce—if not minimize—energy consumption. The object is to reduce the kilowatts usage kW per volume of influent flow $V_Q$. The energy usage or power kW is determined from power meter 46 or the operating frequency of a variable frequency drive, while the volume of influent flow $V_Q$ is determined from the output signal of flow meter 38 or other indicator of demand such as a respirometer, an infrared TDC, etc.

An example of the control process for energy consumption reduction is the following.

First, one measures total influent flow $V_Q$ to tank assembly 12 via conduit 36 during a given time period, e.g., 30 minutes, and additionally measures the energy usage kW over the same 30 minute period. The quotient kW/$V_Q$ is computed by divider 44 and the weir 30 is raised by actuator 32 a predetermined amount, e.g., one inch. The impeller speed is reduced by a suitable increment to maintain the dissolved oxygen content (or other selected variable process parameter) at the same level. After waiting a sufficient interval (e.g., 30 minutes) for a steady state to resume, one again measures the total energy usage kW and total influent flow $V_Q$ to tank assembly 12 via conduit 36 during a 30-minute period. Again the quotient kW/$V_Q$ is computed and the weir 30 is raised a predetermined amount, e.g., one inch. Comparator 54 then determines whether the quotient kW/$V_Q$ increased or decreased from the first measure to the second. In the event of a decrease, control unit 42 operates actuator 32 to raise weir 30 by the same increment of one inch and operates motor 40 to reduce the impeller speed by a suitable increment again to maintain the dissolved oxygen content (or other selected variable process parameter) at the same level. In the event that the quotient kW/$V_Q$ increased from the first measurement to the second, control unit 42 operates actuator 32 to lower weir 30 by a suitable increment, e.g., one inch, and operates motor 40 to increase the impeller speed by a suitable increment for holding the dissolved oxygen content (or other selected variable process parameter) at a desired value.

In another scenario, if there is no change in energy consumption from one adjustment to the next, then the control unit 42 maintains the position of weir 30 and the speed of impeller 14, without adjustment. However, the energy consumption rate can be determined periodically to determine whether there is any change. If a change is detected, the incremental adjustments to the position of weir 30 and the speed of impeller 14 may be reinitiated.

Operation of a wastewater treatment system as depicted in FIGS. 1 and 2 comprises flowing mixed liquor or wastewater (arrow 66) into a treatment pool in tank assembly 12, rotating impeller 14 within the pool to aerate the mixed liquor or wastewater, and adjusting, in concert, a rate of rotation of impeller 14 and the position of weir 30 (and accordingly a level or depth of the pool) to reduce a rate of energy usage per unit inflow volume. More particularly, the rate of impeller rotation and the pool level or depth are adjusted in concert to reduce a rate of energy usage per unit inflow volume while maintaining at least one process parameter—preferably and not necessarily dissolved oxygen content—substantially constant at a given level in the pool.

The control process includes periodically incrementally adjusting the rate of rotation of impeller 14 and periodically incrementally adjusting the position of weir 30, the latter to adjust the level or depth of the wastewater treatment pool. The incremental adjustments are made in accordance with periodic determinations, by comparator 54, of energy usage per unit inflow volume of the mixed liquor or wastewater. The energy usage is typically determined by divider 44 dividing the energy used in rotating impeller 14 over a given time period, as measured by power meter 46, by the volume of wastewater fed to the mixed-liquor pool during the same period, as measured by flow meter 38.

Typically, the energy usage minimization process includes periodically incrementally changing a magnitude of impeller rotation speed in a first direction (for instance, in a positive direction, resulting in a rotation speed increase) and concomitantly periodically incrementally changing a magnitude of pool depth in a second direction (for instance, in a negative direction, reducing the pool depth and concomitantly the degree of impeller immersion), provided that successive adjustments result in a reduced energy usage per unit inflow volume. The direction of impeller speed adjustment and the direction of pool depth adjustment are always opposed so as to maintain the one or more process parameters (e.g., dissolved oxygen content) substantially constant at a given level in the pool, thereby ensuring that process demand is met. Where any given adjustment of the rate of rotation of impeller 14 and the height of weir 30 results in an increased energy usage per unit inflow volume, the subsequent adjustment of impeller rotation speed and pool level or depth entails changing a magnitude of impeller rotation speed in a direction opposite to the previous direction of rotation speed adjustment and concomitantly changing a magnitude of pool depth in a direction opposite the previous change in pool depth. Thus, there may be a series of adjustments stepwise decreasing impeller rotation speed and simultaneously stepwise increasing pool depth and concomitantly the degree of impeller immersion. Control unit 42 measures energy usage per unit volume of inflowing sewage after each adjustment. Once control unit 42 and particularly comparator 54 detects an increase in the energy usage rate, parameter reset module 56 ensures that the next adjustment slightly increases impeller rotation speed and decreases pool depth and impeller immersion.

A method for operating an orbital wastewater treatment system as described herein includes (i) flowing mixed liquor or wastewater into a treatment pool in tank assembly 12 via conduit 36, (ii) using flow meter 38 to measure a rate of inflow of the mixed liquor or wastewater into the tank assembly 12 via conduit 36, (iii) rotating impeller 14 within the pool to aerate the mixed liquor or wastewater, and (iv) using power meter 46 or other power indicator to measure or monitor energy usage by impeller 14. The methodology additionally includes (v) operating divider 44 to periodically calculate the rate of energy usage per unit inflow volume from the measured rate of inflow and the energy usage by impeller 14, and (vi) operating comparator 54 to compare successive calculations of the rate of energy usage per unit inflow volume with one another. More specifically, divider 44 determines a rate of energy usage per unit inflow volume from (a) the rate of inflow as measured by flow meter 38 and (b) energy usage by impeller 14 as measured by power meter 4. After each determination of change in energy usage rate, (vii) parameter reset module 56 is operated to adjust a rate of rotation of impeller 14 via motor 40 and a position of weir 30 (pool level or depth) via actuator 32, in accordance with the net change in energy consumption. The adjustments to impeller rotation speed and to pool depth or impeller immersion degree are preferably made in concert so as to substantially maintain a process parameter such as dissolved oxygen content at a desired level. To achieve this result, the rate of rotation of impeller 14 and the height of weir 30 are adjusted in directions opposite to one another (one increases, the other decreases). The adjustments of the rate of rotation of impeller 14 and the position of weir 30 are in directions identical to those of a prior adjustment when the net change in energy consumption is negative. The adjustments of the rate of rotation of impeller 14 and the position of weir 30 are in directions identical opposite to those of a prior adjustment when the net change in energy consumption is positive.

Accordingly it is contemplated that control unit 42 automatically implements energy consumption minimization. However, an operator may intervene at any time to override control unit 42 and particularly parameter reset module 56.

A control process for energy consumption reduction may include the setting of maximum and minimum weir positions for restricting the possible pool depths being desired limits or boundary levels. In that event, control unit 42 includes an additional functional module in the form of a comparator 62 connected to memory 52 and parameter reset module 56 for ensuring that the preselected maximum and minimum weir positions are not exceeded. Comparator 62 compares a prospective weir position or pool depth from parameter reset module 56 with reference values stored in memory 52 and alerts parameter reset module 56. If a weir position limit would be breached by an impending adjustment, parameter reset module 56 determines new prospective adjustments for the weir position and the impeller speed to avoid the limit breach, while maintaining the selected process parameter at the preselected value. For instance, if the prospective adjusted pool depth falls below a predetermined minimum, then the prospective adjustment is modified to include an incremental raising of the weir and a concomitant incremental decrease in impeller speed. If the prospective adjusted pool depth is above a predetermined maximum, then the prospective adjustment is modified to include an incremental lowering of the weir and a concomitant incremental increase in impeller speed.

Likewise, a control process for energy consumption reduction may include the setting of maximum and minimum impeller speeds. Then control unit 42 includes yet another comparator 64 connected to memory 52 and parameter reset module 56 for ensuring that the preselected maximum and minimum impeller speeds are not exceeded. Comparator 64 compares a prospective adjusted impeller speed from parameter reset module 56 with reference values stored in memory 52 and alerts parameter reset module 56 in the event that a limit will be met or exceeded. If an impeller speed limit would be equaled or exceeded by an impending adjustment, parameter reset module 56 determines new prospective adjustments for the weir position and the impeller speed to avoid the potential transgression, while maintaining the selected process parameter at the preselected value. For instance, if the prospective adjusted impeller speed falls below a predetermined minimum, then the prospective adjustment is modified to include an incremental lowering of the weir position and a concomitant incremental increase in impeller speed. If the prospective adjusted impeller speed is above a predetermined maximum, then the prospective adjustment is modified to include an incremental elevation of the weir and a concomitant incremental decrease in impeller speed.

The various functional blocks of control unit 42, particularly including comparators 54, 62, and 64, divider 44, and parameter reset module 56 may take the form of hard wired logic circuits or, alternatively, generic digital processing circuits of a microprocessor modified by programming to carry out the intended functions.

It is to be understood that the present energy reduction or minimization invention may be used in any wastewater treatment facility having an aeration impeller and an adjustable weir. Orbital wastewater treatment system 10 is merely a diagrammatic example of a generic system that may benefit from the energy reduction system and method disclosed herein. For instance, the present invention may be used in wastewater treatment tanks having multiple impellers and/or a folded mixed-liquor flow path as shown in FIG. 1 of U.S. Pat. No. 4,869,818 or in orbital wastewater treatment tanks having multiple treatment zones, additional partitions and flow control gates as disclosed in U.S. Pat. No. 8,057,674, the disclosures of which patents are hereby incorporated by reference.

As shown in FIG. 1, orbital wastewater treatment tank assembly 12 may include at least one diffuser assembly 70 that operates to inject pressurized air into the mixed liquor or wastewater in the tank assembly. Diffuser assembly 70 includes a diffuser manifold 72 receiving pressurized air via a valve 73 from a blower 74 that is powered by a variable frequency drive (VFD) 76. The present method may include adjusting operating parameters of diffuser assembly 70 in accordance with adjustments in the rate of rotation of impeller 14 and the degree of submergence of the impeller in the pool. More particularly, one may change a diffusion or aeration rate of diffuser assembly 70 so as to balance or compensate for changes in a rate of aeration of the pool by impeller 14. The power applied to blower 74 via VFD 76 may be modified by parameter reset module 56 in accordance with changes in a rate of aeration of the pool by the impeller. Thus if an adjusted rate of rotation of impeller 14 and the degree of impeller submergence result in an increased rate of liquor aeration, parameter reset module 56 may reduce the power applied to blower 74, thereby reducing energy usage.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method for operating an orbital wastewater treatment system including a tank assembly and at least one impeller in said tank assembly for moving mixed liquor about said tank assembly, said method comprising:
   flowing mixed liquor or wastewater into a treatment pool in said tank assembly;
   rotating said impeller within said pool to move said mixed liquor or wastewater about said tank assembly; and
   adjusting in concert a rate of rotation of said impeller and a degree of submergence of said impeller in said pool to reduce a rate of energy usage.

2. The method defined in claim 1, further comprising maintaining at least one process parameter of the mixed liquor or wastewater in the treatment pool substantially constant during said adjusting step.

3. The method defined in claim 2 wherein said at least one process parameter includes dissolved oxygen content.

4. The method defined in claim 1, further comprising periodically making a determination of rate of energy usage, wherein the adjusting step includes periodically incrementally adjusting the rate of rotation of said impeller and periodically incrementally adjusting the degree of submergence of said impeller in said pool based on said determination.

5. The method defined in claim 4 wherein the adjusting step includes periodically incrementally changing a magnitude of impeller rotation speed in a first direction and concomitantly periodically incrementally changing a magnitude of impeller submergence in a second direction, provided that successive adjustments result in a reduced energy usage as a function of wastewater inflow, wherein said first direction and said second direction are opposed so as to maintain said at least one process parameter substantially constant at a given level in said pool.

6. The method defined in claim 5 wherein the adjusting step includes changing a magnitude of impeller rotation speed in a direction opposite to said first direction and concomitantly changing a magnitude of impeller submergence in a direction opposite said second direction, where a prior adjustment of the rate of rotation of said impeller and the degree of submergence of said impeller in said pool resulted in an increased rate of energy usage.

7. The method defined in claim 1 wherein the adjusting step includes determining a rate of inflow of said mixed liquor or wastewater into said tank assembly; measuring or monitoring energy usage by said impeller; periodically calculating the amount of energy usage per unit inflow volume from the determined rate of inflow and the energy usage by said impeller; comparing successive calculations of the amount of energy usage per unit inflow volume with one another; and adjusting the rate of rotation of said impeller and the degree of submergence of said impeller in said pool in accordance with changes in energy usage per unit inflow volume as determined by the comparing of successive calculations.

8. The method defined in claim 7 wherein the adjusting step includes an adjustment protocol taken from the group consisting of (a) decreasing impeller rotation speed and increasing impeller submergence and (b) increasing impeller rotation speed and decreasing impeller submergence.

9. The method defined in claim 7 wherein the determining of said rate of inflow of said mixed liquor or wastewater into said tank assembly includes measuring said rate of inflow of said mixed liquor or wastewater.

10. The method defined in claim 7 wherein the determining of said rate of inflow of said mixed liquor or wastewater into said tank assembly includes selecting said rate of inflow of said mixed liquor or wastewater from a schedule or table of flow rates depending on time of day.

11. The method defined in claim 1 wherein said orbital wastewater treatment system includes at least one weir in said tank assembly, the adjusting of the degree of submergence of said impeller in said pool including moving said weir to change the depth of said pool in said tank assembly.

12. The method defined in claim 1 wherein said orbital wastewater treatment system includes at least one diffuser assembly powered by a blower, further comprising adjusting operating parameters of said diffuser assembly in accordance with adjustments in the rate of rotation of said impeller and the degree of submergence of said impeller in said pool.

13. The method defined in claim 12 wherein the adjusting of operating parameters of said diffuser assembly includes changing a diffusion or aeration rate thereof so as to balance or compensate for changes in a rate of aeration of said pool by said impeller.

14. The method defined in claim 12 wherein the adjusting of operating parameters of said diffuser assembly includes changing a rate of power usage by said blower in accordance with changes in a rate of aeration of said pool by said impeller.

15. A method for operating an orbital wastewater treatment system including a tank assembly, at least one impeller in said tank assembly for moving mixed liquor about said tank assembly, said method comprising:
   flowing mixed liquor or wastewater into a treatment pool in said tank assembly;
   determining a rate of inflow of said mixed liquor or wastewater into said tank assembly;
   rotating said impeller within said pool to move said mixed liquor or wastewater about said tank assembly;
   determining a first rate of energy usage from (a) the determined rate of inflow and (b) energy usage by said impeller;
   adjusting a rate of rotation of said impeller and a degree of submergence of said impeller in said pool;
   after adjusting the rate of rotation of said impeller and the degree of submergence of said impeller in said pool, determining a second rate of energy usage from the determined rate of inflow and the energy usage by said impeller;
   comparing said second rate of energy usage with said first rate of energy usage to determine a net change in energy consumption; and
   subsequently adjusting the rate of rotation of said impeller and the degree of submergence of said impeller in said pool in accordance with the net change in energy consumption.

16. The method defined in claim 15 wherein the adjusting of said rate of rotation of said impeller and said degree of submergence of said impeller in said pool in accordance with the net change in energy consumption includes adjusting said rate of rotation of said impeller and said degree of submergence of said impeller in said pool in concert so as to substantially maintain a process parameter at a predetermined level.

17. The method defined in claim 16 wherein the adjusting of said rate of rotation of said impeller and said degree of submergence of said impeller in said pool in accordance with the net change in energy consumption includes adjusting said rate of rotation of said impeller and said degree of submergence of said impeller in said pool in concert so as to substantially maintain dissolved oxygen content at a given amount in said pool.

18. The method defined in claim 17 wherein the adjusting of the rate of rotation of said impeller and the degree of submergence of said impeller in said pool in accordance with the net change in energy consumption includes adjusting the rate of rotation of said impeller and the degree of submergence of said impeller in said pool in directions opposite to those of a prior adjustment when the net change in energy consumption is positive.

19. The method defined in claim 15 wherein said orbital wastewater treatment system includes at least one diffuser assembly powered by a blower, further comprising adjusting operating parameters of said diffuser assembly in accordance with adjustments in the rate of rotation of said impeller and the degree of submergence of said impeller in said pool.

20. The method defined in claim 19 wherein the adjusting of operating parameters of said diffuser assembly includes changing a diffusion or aeration rate thereof so as to balance or compensate for changes in a rate of aeration of said pool by said impeller.

21. The method defined in claim 19 wherein the adjusting of operating parameters of said diffuser assembly includes changing a rate of power usage by said blower in accordance with changes in a rate of aeration of said pool by said impeller.

22. The method defined in claim 15 wherein the determining of said rate of inflow of said mixed liquor or wastewater into said tank assembly includes measuring said rate of inflow of said mixed liquor or wastewater.

23. The method defined in claim 15 wherein the determining of said rate of inflow of said mixed liquor or wastewater into said tank assembly includes selecting said rate of inflow of said mixed liquor or wastewater from a schedule or table of flow rates depending on time of day.

24. The method defined in claim 15 wherein the adjusting of the rate of rotation of said impeller and the degree of submergence of said impeller in said pool in accordance with the net change in energy consumption includes an adjustment protocol taken from the group consisting of (a) decreasing impeller rotation speed and increasing impeller submergence and (b) increasing impeller rotation speed and decreasing impeller submergence.

25. The method defined in claim 15 wherein the adjusting of the rate of rotation of said impeller and the degree of submergence of said impeller in said pool in accordance with the net change in energy consumption includes adjusting the rate of rotation of said impeller and the degree of submergence of said impeller in said pool in directions identical to those of a prior adjustment when the net change in energy consumption is negative.

26. The method defined in claim 15 wherein the adjusting of the rate of rotation of said impeller and the degree of submergence of said impeller in said pool in accordance with the net change in energy consumption includes adjusting the rate of rotation of said impeller and the degree of submergence of said impeller in said pool in directions opposite to those of a prior adjustment when the net change in energy consumption is positive.

27. The method defined in claim 15 wherein said orbital wastewater treatment system includes at least one weir in said tank assembly, the adjusting of the degree of submergence of said impeller in said pool including moving said weir to thereby change a depth of said pool in said tank assembly.

28. An orbital wastewater treatment system comprising:
a tank assembly;
at least one impeller in said tank assembly for moving mixed liquor about said tank assembly;
a movable weir operatively mounted to said tank assembly;
a mixed-liquor infeed conduit extending to said tank assembly;
a flow meter in operative relationship to said conduit;
a variable speed motor operatively connected to said impeller;
an actuator operatively connected to said weir; and
a control unit operatively connected to said flow meter, said actuator and said motor,
said control unit being configured to calculate a rate of energy usage from impeller activity and a rate of mixed-liquor or wastewater infeed as measured or sensed by said flow meter,
said control unit being further configured to operate said actuator and said motor to adjust a rate of rotation of said impeller and a degree of submergence of said impeller in a wastewater pool in said tank assembly to reduce a rat of energy usage.

29. The system defined in claim 28 wherein said control unit is configured to operate said actuator and said motor to periodically and incrementally adjust the rate of rotation of said impeller and the degree of submergence of said impeller in said pool in opposing directions to maintain at least one process parameter substantially constant at a given level in said pool.

30. The system defined in claim 29 wherein said at least one process parameter includes dissolved oxygen content.

31. The system defined in claim 28 wherein said control unit is configured to automatically operate said actuator and said motor to periodically incrementally change a magnitude of impeller rotation speed in a first direction and concomitantly periodically incrementally change a magnitude of impeller submergence in a second direction, provided that successive adjustments result in a reduced rate of energy usage, wherein said first direction and said second direction are opposed so as to maintain said at least one process parameter including dissolved oxygen content substantially constant at said given level in said pool.

32. The system defined in claim 31 wherein said control unit is configured to automatically operate said actuator and said motor to change a magnitude of impeller rotation speed in a direction opposite to said first direction and concomitantly change a magnitude of impeller submergence in a direction opposite said second direction, where a prior adjustment of the rate of rotation of said impeller and the degree of submergence of said impeller in said pool resulted in an increased rate of energy usage.

33. The system defined in claim 28 wherein said control unit is configured to automatically operate said actuator and said motor in response to calculated rates of energy usage as determined by said control unit.

34. The system defined in claim 28 wherein said control unit is configured to automatically compare successive calculations of the rate of energy usage with one another and to adjust the rate of rotation of said impeller and the degree of submergence of said impeller in said pool in accordance with changes in energy usage as determined by the comparing of successive calculations.

35. The system defined in claim 28, further comprising a diffuser assembly submerged in part in said pool, said control unit being operatively connected to said diffuser assembly for automatically adjusting operating parameters of said diffuser assembly in accordance with adjustments in the rate of rotation of said impeller and the degree of submergence of said impeller in said pool.

36. The system defined in claim 35 wherein said control unit is configured to adjust the operating parameters of said diffuser assembly to change a diffusion or aeration rate thereof so as to balance or compensate for changes in a rate of aeration of said pool by said impeller.

37. The method defined in claim 19 wherein said diffuser assembly includes a blower, said control unit being configured to change a rate of power usage by said blower in accordance with changes in a rate of aeration of said pool by said impeller.

* * * * *